United States Patent [19]

Oreglia et al.

[11] Patent Number: 4,680,340
[45] Date of Patent: Jul. 14, 1987

[54] EASY TO OPEN PACKAGE AND A METHOD OF MAKING SAME

[75] Inventors: Aurelio Oreglia, Mozzate; Paolo Botto; Claudio Freschi, both of Milan, all of Italy

[73] Assignee: W. R. Grace & Co., Cryovac Div., Duncan, S.C.

[21] Appl. No.: 803,032

[22] Filed: Nov. 29, 1985

[30] Foreign Application Priority Data

Feb. 7, 1985 [DE] Fed. Rep. of Germany ....... 3504463

[51] Int. Cl.[4] ...................... C08L 51/04; C08L 33/02; C08L 33/04
[52] U.S. Cl. ...................... 525/72; 525/201; 525/222; 428/35; 428/500
[58] Field of Search ........... 525/201, 222, 72; 428/212, 355, 35, 500

[56] References Cited

U.S. PATENT DOCUMENTS 3,001,689  9/1961  Burton .................... 383/84
4,251,584  2/1981  Van Engelen et al. ........... 525/222
4,299,745  11/1981  Godfrey ................... 525/222
4,311,808  1/1982  Su ........................ 525/222
4,376,845  3/1983  Metzger .................. 525/222
4,537,305  8/1985  Takanashi ................ 206/524.2
4,567,219  1/1986  Tominaga et al. .......... 525/201

FOREIGN PATENT DOCUMENTS 0149934  9/1983  Japan ..................... 525/222

Primary Examiner—Roland E. Martin
Assistant Examiner—James J. Seidleck
Attorney, Agent, or Firm—John J. Toney; William D. Lee, Jr.; Mark B. Quatt

[57] ABSTRACT

A seal layer for an easy open package consisting essentially of 40% or less, by weight, of a first polymer having a melt flow index of less than 5 selected from the group consisting of ionomers and ethylene-vinyl acetate copolymers, and 60% or more by weight of a second polymer having a melt flow index greater than 20 being selected from the group consisting of low density polyethylene, ethylene-vinyl acetate copolymers, and modified ethylene-vinyl acetate copolymers, whereby the second polymer is a low density polyethylene if the first polymer is an ethylene-vinyl acetate copolymer.

4 Claims, 4 Drawing Figures

EASY TO OPEN PACKAGE AND A METHOD OF MAKING SAME

BACKGROUND OF THE INVENTION

The invention relates to an easy to open package wherein an article is sealed between upper and lower thermoplastic webs, and to a method of making such package. More specifically the invention is directed to a package which is tightly sealed and will not be easily destroyed by the usual handling during shipment and storage but which may easily be opened by manually peeling apart the upper from the lower web of the package.

A wide variety of products, especially food products like meat, sausages, cheese and the like are being offered in visually attractive packages made from two thermoplastic webs using the vacuum skin packaging, thermoforming or other processes. In a vacuum skin packaging process a product is placed on a support film or formed tray of relatively rigid material and, by differential air pressure, a heated film above the product is molded down upon and around the product and against the support, the space between the upper film and the support having been evacuated. The upper heated film forms a tight skin around the product and is sealed to the support. In the thermoforming process the upper thermoplastic web is sealed to the flange-like edges of the support using heated sealing bars or similar equipment.

The problem that is encountered is that the heated film seals so strongly to the support that it is difficult to separate the two webs and to open the package. An easy to open package comprising two thermoplastic webs safely sealed together should be easily openable by manually pulling apart the two webs, normally starting from a point like a corner of the package where the upper web has purposely not been sealed to the support. In this manner the use of scissors, a knife or other devices to open the package can be avoided.

The easy to open packages of the prior art are based on two different mechanisms. The first concept is being widely used in thermoformed, formfill-seal and also in vacuum skin packages. When opening the package the separation between the two thermoplastic webs occurs at the seal interface, i.e. between the two contact surfaces sealed to each other. The opening or peeling strength (force per given width) is therefore identical to the seal strength and may be controlled by appropriate choice of the chemical similarity or dissimilarity of the two sealed layers.

It is a disadvantage of this type of easy opening mechanism that it is strongly effected by the conditions of the sealing process. Thus, too high sealing temperatures will result in a stronger seal so that in turn the package can no longer be easily opened. Further, the opening or peeling strength will widely differ for a series of packages and a rupture of the upper web may occur during opening when it is sealed too strongly to the support web.

The second and more recent easy opening mechanism is currently being used in many applications, for instance for rigid thermoformed containers sealed with a flexible film where the sealed areas are relatively narrow. Basically the opening of the package is achieved through an initial breakage through the thickness of one of the sealing layers followed by delamination of this layer from the underlying support or film. A typical example is a system where both the first and the second seal layer are made from polyethylene and one of the seal layers is adhered to a polyamide surface. The low bond strength between the polyethylene and the polyamide permits the delamination to take place during opening of the package. When the delamination reaches the area of the packed product a second breakage through the sealing layer takes place. As a result the entire sealing layer of one of the two webs is separated from one of the webs and is left sealed to the opposite web.

The opening strength is directly related to the bond strength between the seal layer and the adjacent film layer and accordingly it depends primarily on the chemical similarity or dissimilarity of the two materials. However, the coextrusion conditions such as pressure, temperature and time of contact between the molten materials have also a major effect on the final bond strength between the two layers.

The above described prior art easy opening systems are all based on an "adhesive failure" that takes place either at the seal interface between the two seal layers or through delamination of the seal layer from the corresponding underlying web. The systems are characterized by an opening strength which is not constant and can be either too low (which may lead to an inadvertent opening of the package) or too high (making it difficult to manually open the package). The opening strength of the known systems is significantly affected by the production conditions, the packaging machine conditions, and the environmental conditions (mainly temperature) during the packaging process and storage.

SUMMARY OF THE INVENTION

It is an object of the present invention to provide a package which is safely sealed and may be subjected to normal handling conditions during shipment and storage without inadvertent rupture but which provides at the same time easy to open characteristics, i.e. in which the two webs may be manually peeled apart applying a relatively low and constant force during the opening operation.

It is a further object to provide a method of producing such package in a simple manner using existing conventional equipment.

The desired benefits and advantages are obtained through an easy to open package in which the opening occurs through a cohesive failure mechanism which differs distinctly from the prior art using an adhesive failure opening mode as described above. The easy opening system of the invention occurs by internal rupture of a thin seal layer which during opening breaks along a plane parallel to the layer itself.

DETAILED DESCRIPTION OF THE INVENTION

The easy to open package with an article being sealed between upper and lower thermoplastic webs comprises an upper web of a first polymeric material and a lower web of a second polymeric material, and a seal layer disposed between and adhered to each of the opposite surfaces of the two webs, the adhesive seal strength of the seal layer to the first and second surfaces being greater than its internal cohesive strength, whereby when the upper and lower webs are peeled apart manually the seal layer separates due to internal cohesive failure and portions of the seal layer are left on the first and second surfaces. The seal layer is therefore characterized by having a high sealability to the opposed surfaces of the two webs and by having a very low cohesive internal strength. The high sealability to the two thermoplastic webs results in a strong seal which guarantees the pack integrity during handling. The low internal cohesive strength of the thin seal layer provides a constant opening strength of the package through breakage of this seal layer which splits during the opening operation, portions of the seal layer being left on the opposing surfaces of the two webs without impairing the visual appearance of the opened package or the product.

Preferably the resistance of the seal layer to peeling from the surface of the upper or lower web is about 500 g/25 mm width stronger than the internal cohesive strength of the seal layer in order to provide for cohesive failure and to avoid delamination. The resistance of the seal layer to peeling from said surfaces may be about 1000 to 1500 g/25 mm width while the internal cohesive strength of the seal layer is preferably in the range of about 200 to 1000 and most preferably between 300 and 600 g/25 mm width.

It has been discovered that a seal layer exhibiting the desired relatively low cohesive strength may be obtained by blending two polymers, namely (a) a first polymer having a relatively low melt flow index selected from the group consisting of ionomers and ethylene/vinyl acetate copolymers, and (b) a second polymer having a melt flow index substantially higher than the first polymer and being selected from the group consisting of low density polyethylene, ethylene/vinyl acetate copolymers, and modified ethylene/vinyl acetate copolymers.

The two polymers should not only have a different melt flow index but should also be chemically different in order to obtain the desired weakening of the internal structure of the seal layer. Thus, the second polymer will be a low density polyethylene and not an ethylene/vinyl acetate copolymer if the first polymer is an ethylene/vinyl acetate copolymer.

Preferably the difference between the melt flow indices of the first polymer and of the second polymer in the polymer blend for the seal layer will be at least 10 and more preferably more than 20 when measured under the conditions E of ASTM D 1238.

Suitable first polymers for the seal layer blend are polymeric materials having a low melt flow index of less than 5 and more preferably less than 2. Examples are ionomeric resins such as acid-modified polyethylene with an acid content of up to 10% by weight and a high degree of ion linking (Na). S-uch polymers are commercially available under the trade name SURLYN 1601 (DuPont). Also suitable are ethylene/vinyl acetate copolymers with a vinyl acetate content of up to 20% by weight as they are commercially available under the trade name ELVAX 3165 (DuPont).

The second polymer in the seal layer blend has a melt flow index which is preferably 20 or higher, Examples for suitable polymers are ethylene/vinyl acetate copolymers with a vinyl acetate content up to 30% by weight such as OREVAC (Atochem) and acid modified ethylene/vinyl acetate copolymers such as BYNEL (DuPont). Also suitable are low density ethylene polymers such as LD 990E (Dow Chemical).

Normally the blend comprises a major proportion of the first polymer and a minor proportion of the second polymer. Preferably the blend comprises about 10 to 50, especially 20 to 30% by weight of the second polymer (based on the blend).

The two polymers are blended by thoroughly mixing them in powder form and then melt extruding the blend onto one or both webs of the package. Apparently the polymer having a high melt flow index is highly dispersed in the polymer having a low melt flow index and thereby weakens the internal cohesion of the seal layer.

The total thickness of the seal layer is advantageously in the range of about 5 to 15 microns. A relatively thin seal layer is preferred since this will result in a rather smooth breakage due to cohesive failure parallel to the seal layer plane. A thicker layer may allow the breakage to occur in different zones or planes of the seal layer so that loose strips and rough surfaces are formed.

As stated above it is important to achieve a relatively strong adhesion between the seal layer and the upper and lower web of the package, respectively. Accordingly the innermost layer of the two webs should be such that it provides good adhesion to the seal layer. Normally the seal layer will only be provided on one of the two webs and if this is carried out in a coextrusion process a thin support film for the polymer blend forming the seal layer will preferably be used; this support film will at the same time serve to promote the adhesion between the seal layer and the underlying web. The contact surface of the opposite web should also be provided with a top layer showing good adhesion to the seal layer. Alternatively it is possible to provide this adhesion promoting layer on top of the seal layer so that the former will only come into contact with the second web when the sealing operation is carried out.

As stated above the present invention provides particular benefits when used in vacuum skin packages but its applicability is not restricted thereto. It is also useful in thermoforming, form fill seal and other packages. The chemical composition and structure of the two thermoplastic webs forming the package is not critical, provided that the adherence between the seal layer of the invention and the contact surface of the thermoplastic webs is sufficiently strong so that during opening of the package no delamination will occur. Mono- or multiply webs may be used as they are known to the expert skilled in the packaging art. The thermoplastic webs may also be oriented and/or irradiated in order to provide heat shrink properties.

The following examples serve to further illustrate the invention which, however, is not limited thereto.

EXAMPLES 1 to 5 AND COMPARATIVE EXAMPLES A TO G

In order to have identical conditions for the comparison of the behaviour of the seal layer, all other structural characteristics and process parameters were held identical or constant, respectively.

The seal layer was in all cases provided on the bottom web and tested in a vacuum skin packaging process using a CRYOVAC VS 44 machine. The machine conditions were as follows:

| | |
|---|---|
| Dome temperature | 200° C. |
| Infrared preheating | 45% |
| Forming station temperature | 85° C. |
| Tray depth | 5 mm |

The bottom web consisted of a semi-rigid structure comprising a calendered rigid polyvinyl chloride sheet (200 microns) laminated to a two ply sealing layer film (total thickness 33 microns) produced by hot blown coextrusion and consisting of a support film of ethylene/vinyl acetate copolymer (vinyl acetate content 3%) having a thickness of 25 microns and a seal layer of the polymer blend to be tested having a thickness of 8 microns.

As the top web a flexible coextruded film was used with a contact surface of an ionomeric resin (SURLYN 1702 of DuPont) having a thickness of 19 microns. Both irradiated and non-irradiated top webs were tested.

The test results are summarized in the following table 1 in which structures according to the present invention are designated with numbers 1 to 5 while comparative structures are designated A to G.

Each quoted result of the packaging opening strength is the average of 9 samples. Before being tested the samples (width 25 mm) were stored for at least 2 hours at room temperature after the packaging process on the CRYOVAC VS 44 machine. The tests were run on an Acquati dynamometer at a testing speed of 80 cm/min.

The raw materials used in the tests tabulated in table 1 are listed and described in table 2.

TABLE 1

| No. | FIRST MATERIAL TRADE NAME | M.F.I.* | % b.w. in blend | SECOND MATERIAL TRADE NAME | M.F.I.* | % b.w. in blend | OPENING STRENGTH (g/25 mm) | COMMENTS |
| --- | --- | --- | --- | --- | --- | --- | --- | --- |
| A | SURLYN 1601 | 1.3 | 80 | BYNEL 2002 | 10 | 20 | n.m. | strong seal, delamination and breakage of top web |
|   |   |   | 70 |   |   | 30 | n.m. | stong seal, delamination and breakage of top web |
|   |   |   | 60 |   |   | 40 | n.m. | strong seal, delamination and breakage of top web |
| 1 |   |   | 90 | BYNEL 1124 | 25 | 10 | 820 | easy opening, cohesive failure |
|   |   |   | 85 |   |   | 15 | 530 | easy opening, cohesive failure |
|   |   |   | 80 |   |   | 20 | 450 | easy opening, cohesive failure |
|   |   |   | 75 |   |   | 25 | 330 | easy opening, cohesive failure |
|   |   |   | 70 |   |   | 30 | 330 | easy opening, cohesive failure |
| 2 | SURLYN 1601 | 1.3 | 85 | BYNEL 1025 | 35 | 15 | 800 | easy opening, cohesive failure |
|   |   |   | 80 |   |   | 20 | 300 | easy opening, cohesive failure |
|   |   |   | 70 |   |   | 30 | 180 | easy opening, cohesive failure |
| B |   |   | 80 | OREVAC 9307 | 10 | 20 | n.m. | strong seal, breakage and delamination of top web |
|   |   |   | 70 |   |   | 30 | n.m. | strong seal, breakage and delamination of top web |
|   |   |   | 60 |   |   | 40 | n.m. | strong seal, breakage and delamination of top web |
| 3 |   |   | 85 | OREVAC 9004 | 25 | 15 | 410 | easy opening, cohesive failure |
|   |   |   | 80 |   |   | 20 | 430 | easy opening, cohesive failure |
| 4 | SURLYN 1601 | 1.3 | 85 | LD 990 E | 21 | 15 | 400 | easy opening cohesive failure |
|   |   |   | 80 |   |   | 20 | 380 | easy opening cohesive failure |
|   |   |   | 70 |   |   | 30 | 200 | easy opening cohesive failure |
| C |   |   | 80 | PRIMACOR 3440 | 10 | 20 | n.m. | strong seal, delam. of top web |
|   |   |   | 70 |   |   | 30 | n.m. | strong seal, delam. of top web |
|   |   |   | 60 |   |   | 40 | n.m. | strong seal, delam. of top web |
| D | PRIMACOR 1410 | 1.5 | 85 | BYNEL 1124 | 25 | 15 | n.m. | strong seal, delam. & breakage of top web |
|   |   |   | 80 |   |   | 20 | n.m. | strong seal, delam. & breakage of top web |
|   |   |   | 70 |   |   | 30 | n.m. | strong seal, delam. & breakage of top web |
| E |   |   | 85 | OREVAC 9004 | 25 | 15 | n.m. | strong seal, delam. & breakage of top web |
|   |   |   | 80 |   |   | 20 | n.m. | strong seal, delam. & breakage of top web |
|   |   |   | 70 |   |   | 30 | n.m. | strong seal, delam. & breakage of top web |
| F | ELVAX 3165 | 0.7 | 85 | PRIMACOR 3440 | 10 | 15 | n.m. | strong seal, breakage and delamination of the top web |
|   |   |   | 80 |   |   | 20 | n.m. | strong seal, breakage and delamination of the top web |
| G | ELVAX 3165 | 0.7 | 85 | LD 990 E | 21 | 15 | n.m. | strong seal, breakage and delamination of the top web |
|   |   |   | 70 |   |   | 30 | n.m. | strong seal, breakage and delamination of the top web |
| 5 |   |   | 60 |   |   | 40 | 420 | Easy opening cohesive failure |

*ASTM D1238 Cond. E
n.m. = not measurable (delamination/breakage of top web) average value greater than 1000 g/25 mm
n.a. = not available

TABLE 2

| TRADE NAME | SUPPLIER | DESCRIPTION |
| --- | --- | --- |
| SURLYN 1601 | DU PONT | Ionomer resin, 10% acid content, high degree of ion linking (Na) |
| PRIMACOR 1410 | DOW CHEMICAL | Ethylene-Acrylic Acid Copolymer (AA = 9%) |
| PRIMACOR 3440 | DOW CHEMICAL | Ethylene-Acrylic Acid Copolymer (AA = 9%) |
| ELVAX 3165 | DU PONT | EVA (VA = 18%) |
| BYNEL 2002 BYNEL 1124 BYNEL 1025 | DU PONT | EVA copolymers acid modified |
| OREVAC 9307 | ATOCHEM | EVA (VA = 14%) |
| OREVAC 9004 | ATOCHEM | EVA (VA = 28%) |
| LD 990 E | DOW | LDPE |

TABLE 2-continued

| TRADE NAME | SUPPLIER | DESCRIPTION |
|---|---|---|
| | CHEMICAL | |

The above results show that the desired seal layer having low internal cohesive strength is not obtained
  when two polymers are blended, the melt flow indices of which do not differ by at least 10 (tests A, B, C, and F),
  that the internal cohesive strength is also too great if the two polymers are chemically too similar, e.g. are ethylene/acrylic acid and ethylene/vinyl acetate copolymers (tests D and E)
  that for certain combinations of polymers a rather high proportion of the second polymer having a high MFI may be required (test G).

On the other hand, excellent results are obtained when the seal layer blend comprises two polymers of sufficiently different melt flow index provided that the two polymers are chemically also different (examples 1 to 3 and 4). While normally the proportion of the second polymer having the higher melt flow index will not exceed 30% by weight (based on the polymer blend) a proportion up to 40 and more percent by weight may be required for certain combinations (example 5).

BRIEF DESCRIPTION OF THE DRAWING

The attached drawings serve to further illustrate the invention.

DETAILED DESCRIPTION OF THE DRAWINGS

Figure 1:
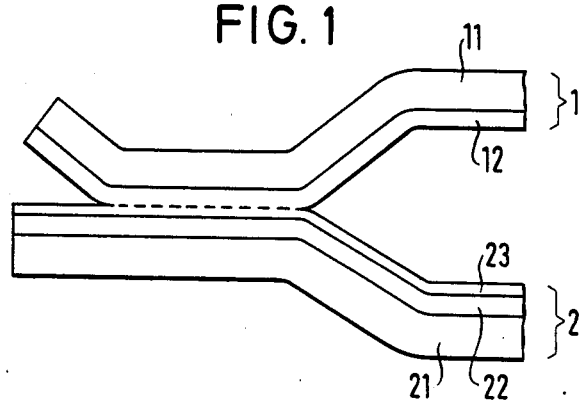
FIGS. 1 to 3 illustrate schematically the opening mechanism of one embodiment of a package according to the invention.

FIG. 1 shows the sealing of a package according to the present invention comprising an upper web 1 and a lower web 2. The upper web consists of a thermoplastic multiply film 11 of which the innermost layer 12 consists of a thin (about 20 microns) layer of an ionomeric resin to promote the adhesion to the seal layer. The lower web 2 consists of an outer layer 21 which may be of flexible or rigid polyvinyl chloride. The contact surface opposed to the upper web is provided with a layer 22 of an ethylene/vinyl acetate copolymer serving as a support film for the thin seal layer in the coextrusion process in which a very thin layer of the polymer blend for the seal layer would otherwise be difficult to handle. The thin (about 8 microns) seal layer 23 is provided on the inner contact surface of the lower web 2. Upon sealing of the two webs to form a package the seal layer 23 will strongly adhere to the inner contact surface 12 of the upper web.

Figure 2:
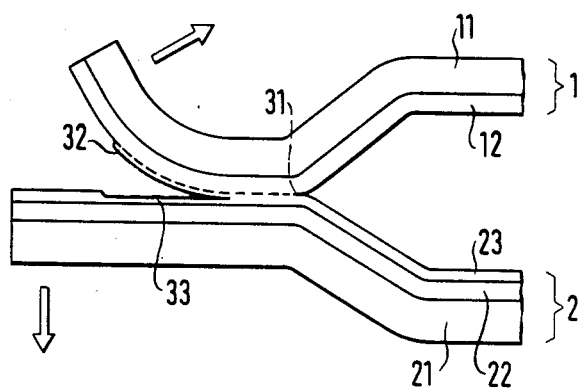
Figure 3:
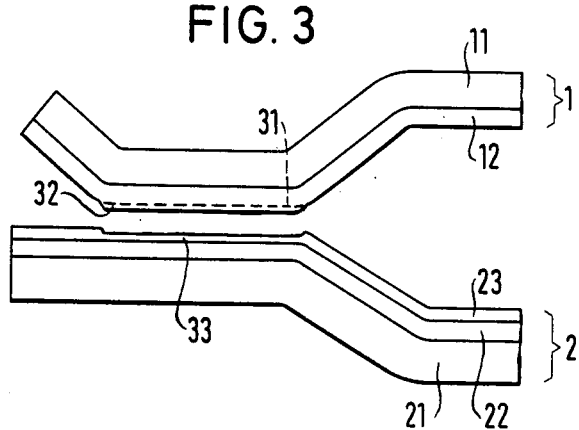

When tearing the package open as illustrated in FIG. 2 by peeling the upper web 1 apart from the lower web 2 the break does not occur along the seal interface (dotted line 31) but rather within the seal layer 23 so that a portion 32 thereof sticks to the upper web while the remainder 33 is left on the lower web 2, compare also FIG. 3 showing the two webs after complete separation from each other.

Figure 4:
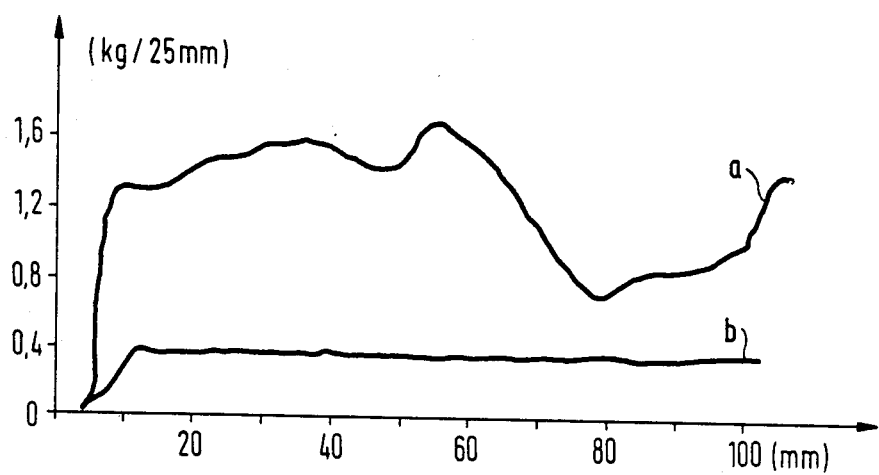
FIG. 4 is a graph comparing the opening strength required to open a conventional package and the easy to open package of the invention.

FIG. 4 represents a graph in which the opening strength in kg/25 mm width has been plotted against the sample length in mm. Curve a represents a conventional "easy to open" package in which the break occurs due to adhesive failure. It is obvious that the necessary opening strength is relatively high and not constant over the sample length. Curve b for a package of the present invention shows that the required opening strength is much lower and essentially constant over the entire length of the samples.

We claim:

1. A seal layer for an easy to open package consisting essentially of
   (a) 40% or less, by weight, of a first polymer having a melt flow index of less than 5 selected from the group consisting of ionomers and ethylene/vinly acetate cpolymers, and
   (b) 60% or more by weight of a second polymer having a melt flow index greater than 20 being selected from the group consisting of low density polyethylene, ethylene/vinyl acetate copolymers, and modified ethylene/vinyl acetate copolymers, whereby the second polymer is a low density polyethylene if the first polymer is an ethylene/vinyl acetate copolymer.

2. A seal layer according to claim 1 in which the melt flow indices of the first polymer is less than 2 and the second polymer in the seal layer is greater than 20 when measured under the conditions E of ASTM D 1238.

3. A seal layer according to claim 1 in which the melt flow indices of the first polymer range from 0.7 to 5 and of the second polymer in the seal layer range from 27 to 35 when measured under the conditions E of ASTEM D 1238.

4. A seal layer according to anyone of claims 1 to 3 in which the seal layer has a total thickness in the range of about 5 to 15 microns.

* * * * *

UNITED STATES PATENT AND TRADEMARK OFFICE
CERTIFICATE OF CORRECTION

PATENT NO. : 4,680,340

DATED : July 14, 1987

INVENTOR(S) : Aurelio Oreglia, Paolo Botto, Claudio Freschi

It is certified that error appears in the above-identified patent and that said Letters Patent is hereby corrected as shown below:

In column 8 of the claims, line 45, delete the number "5", substituting therefor --1.5--.

Signed and Sealed this

Twenty-third Day of February, 1988

Attest:

DONALD J. QUIGG

*Attesting Officer*  *Commissioner of Patents and Trademarks*